United States Patent [19]

Kawaguchi et al.

[11] Patent Number: 5,348,315

[45] Date of Patent: Sep. 20, 1994

[54] METALLIC GASKET

[75] Inventors: Shigeru Kawaguchi, Daitou; Kenji Kubouchi, Hirakata; Hiroshi Uemura; Kunitoshi Inoue, both of Higashiosaka, all of Japan

[73] Assignee: Nippon Gasket Co., Ltd., Osaka, Japan

[21] Appl. No.: 913,657

[22] Filed: Jul. 16, 1992

[30] Foreign Application Priority Data

Jul. 17, 1991 [JP] Japan ................ 3-201207
Aug. 1, 1991 [JP] Japan ................ 3-214129

[51] Int. Cl.⁵ ............................. F16J 15/08
[52] U.S. Cl. ................ 277/235 B; 277/180
[58] Field of Search ........... 277/235 B, 236, 180, 277/233, 234, 235 R

[56] References Cited

U.S. PATENT DOCUMENTS

| 3,053,544 | 9/1992 | Gorsica . | |
|---|---|---|---|
| 4,203,608 | 5/1980 | Nicholson | 277/235 B |
| 4,728,110 | 3/1988 | Nakasone | 277/235 B |
| 4,836,562 | 6/1989 | Yoshino | 277/235 B |
| 5,213,345 | 5/1993 | Udagawa | 277/235 B |

FOREIGN PATENT DOCUMENTS

| 0230804 | 8/1987 | European Pat. Off. | 277/235 B |
|---|---|---|---|
| 0486255 | 5/1992 | European Pat. Off. | 277/235 B |
| 101574 | 5/1988 | Japan . | |
| 149479 | 6/1988 | Japan . | |
| 6458868 | 3/1989 | Japan | 277/235 B |
| 4181070 | 6/1992 | Japan . | |
| 4357371 | 12/1992 | Japan . | |
| 2053382 | 2/1981 | United Kingdom . | |

*Primary Examiner*—Diego F. F. Gutierrez
*Assistant Examiner*—Daniel G. DePumpo
*Attorney, Agent, or Firm*—Browdy and Neimark

[57] ABSTRACT

The metallic gasket consists of a first elastic metallic plate having beads and folded portions and a second elastic metallic plate having beads, laminated on each other. The folded portions are formed by bending the plate alone the circumferences of cylinder bore holes, and the beads are formed on the portions of the plate spaced from the circumferences of the cylinder bore holes at a predetermined distance in the radially outward direction thereof, whereby double annular seal portions are formed. The projecting portions of the beads on the second elastic metallic plate are fitted in or brought into contact with the recessed portions or projecting portions of the beads on the first elastic metallic plate. The spring constant of the gasket becomes equal to the sum of those of the two plates, and this enables the stress carried by the plates to be lessened, and the durability of the gasket to be improved. It is also possible to reduce the width of the parts of the beads which are between the cylinder bore holes and use such a gasket suitably for an engine in which the distance between cylinder bores is small.

10 Claims, 8 Drawing Sheets

METALLIC GASKET

BACKGROUND OF THE INVENTION

1. Field of the Invention

This invention relates to a metallic gasket used to seal the joint surfaces of a cylinder head and a cylinder block of a multicylinder internal combustion engine.

2. Description of the Prior Art

A metallic gasket formed out of a metallic material has been used to seal the opposite joint surfaces of structural members, such as a cylinder head and a cylinder block of an internal combustion engine. In a recent internal combustion engine, the increasing of the output level and the decreasing of the weight have been demanded. In order to meet these requirements, a cylinder head and a cylinder block tend to be formed out of an aluminum material having a low specific gravity instead of steel or a cast metal having a high specific gravity which has heretofore been used. An aluminum material has a small weight but the rigidity thereof is low. Therefore, while an internal engine in which the cylinder head and cylinder block are formed out of an aluminum material is operated, the relative displacement of the cylinder head with respect to the cylinder block tends to increase. A metallic gasket has beads near the circumferences of the through holes therein which correspond to the cylinder bores and passages for water and oil. When the cylinder bead and cylinder block are fixed by tightening the same with bolts, these beads form annular resilient contact members with respect to the opposite joint surfaces of the cylinder head and cylinder block and seal these joint surfaces.

There is recently a tendency for a cylinder head and a cylinder block, between which such a metallic gasket is to be inserted, to be formed out of an aluminum material for the purpose of reducing the weight of an internal combustion engine, and the rigidity of these structural members of engine therefore necessarily decreases. When the joint surfaces of these structural members are tightened with locking bolts via a metallic gasket consisting of a single plate, the opposite joint surfaces are liable to be fixed in a non-aligned state since the holes for these locking bolts scatter in the outer peripheral portion, or a portion comparatively close to the outer peripheral portion, of the metallic gasket, i.e., since these holes are not necessarily distributed uniformly around the cylinder bore-aligned holes in the metallic gasket. Consequently, a high-temperature and high-pressure combustion gas enters a narrow clearance between the portions of the opposite joint surfaces of the structural members which are distorted greatly, such as the portions of the same joint surfaces which are among the cylinder bore-aligned holes, to cause the beads on the metallic gasket inserted between these joint surfaces to be corroded and soiled, whereby the sealing effect of the metallic gasket lowers.

During a combustion cycle of an internal combustion engine, the distance between the cylinder head and cylinder block increases and decreases repeatedly, and stress, i.e. mechanical stress and thermal stress are exerted repeatedly on the metallic gasket which is provided between the cylinder head and cylinder block. This stress due to load change is most pronounced in the portions of the cylinder block and cylinder head which have the lowest rigidity. As a result, permanent set in fatigue and cracks occur in the beads to cause the sealing performance of the metallic gasket to be deteriorated.

There is a metallic gasket provided with a layer of a soft metal or a spacer member on a top portion of each bead for the purpose of improving the sealing performance of a high-pressure portion to be sealed, i.e. a portion around each cylinder bore-aligned hole. In both of such metallic gaskets, layers of a soft metal and spacer members are attached to the top portions of the beads to increase the height thereof. When the joint surfaces of the structural members are pressed against each other by tightening the cylinder heal with respect to the cylinder block, the metallic gasket is compressed stronger by as much as an increase in height of each bead due to the addition of the layer of a soft metal or spacer member. Consequently, the improvement of the sealing performance of the portions of joint surfaces of the structural members which are around the cylinder bore-aligned holes can be expected. Since these members of a soft material form padding, it is considered that the padding scatters an extreme pressure, improves the sealing performance of the metallic gasket and joint surfaces or protects the beads.

However, since the portions of the metallic gasket on which the layer of a soft metal or spacer members are provided are limited to the beads, the number of high-pressure portions on the joint surfaces, i.e. the number of seal portions does not basically increase, and aligning the layers of a soft metal or spacer members with the beads and fixing the same thereto during the manufacture of a metallic gasket is difficult and causes an increase in the manufacturing cost.

There is another known metallic gasket (disclosed in, for example, Japanese Patent Laid-Open Nos. 101574/1988 and 149479/1988) other than the above-described metallic gaskets which is provided with beads projecting from the circumferential portions, which form portions to be pressure-sealed, of cylinder bore-aligned holes, as well as grommets attached to the circumferences of the cylinder bore-aligned holes. Even when the grommets attached to the circumferences of the cylinder bore-aligned holes in such a metallic gasket is first exposed to a high-temperature high-pressure fluid, such as a combustion gas, they shut off the fluid, and, even when the fluid should leak from the grommets, the beads shut off the same. These publications also disclose an idea of correcting the irregularity of a clearance between the opposite joint surfaces of the cylinder head and cylinder block by tightening these structural members. However, attaching grommets to the circumferences of the cylinder bore-aligned holes is accompanied by troublesome operations, such as the production of grommets and the fitting and deforming of the grommets around the cylinder bore-aligned holes, and causes the manufacturing cost to increase.

The applicant of the present invention developed a metallic gasket shown in FIGS. 29 and 30, and filed previously Japanese Patent Application No. 306295/1990 therefor. This metallic gasket 20 has beads 24A, 24B formed on the portions of an elastic metallic plate 21 which are spaced from the circumferences of cylinder bore-aligned holes 22A, 22B in the same plate 21 in the radially outward direction thereof, so as to extend along the circumferences of these holes 22A, 22B, and folded portions 25A, 25B formed by folding back the portions of the metallic plate 21 which are around the cylinder bore-aligned holes 22A, 22B in the radially outward direction thereof, the folded portions 25A, 25B of the elastic metallic plate 21 being formed to a predetermined thickness and heat treated. In this metallic gasket 20, a thickness regulating metallic plate 26 is laminated on the portions of the elastic metallic plate 21 which are on the radially outer side of the beads 24A, 24B and on the side of the plate 21 on which the projecting surfaces of the beads 24A, 24B extend, and metallic plates 27A, 27B are held in the folded portions 25A, 25B.

The applicant of the present invention has already proposed another metallic gasket 30 which is shown in FIGS. 31 and 32 and identical with the above proposed metallic gasket having beads and folded portions, except that it also has regulating plate 36 adapted to regulate the strength of the elastic metallic plate and laminated on the surface of the elastic metallic plate on which the projecting surfaces of the beads 34A, 34B extend, in such a manner that the regulating plate 36 extends to the regions which are on the radially outer side of the beads 34A, 34B. In this metallic gasket 30, soft members 37A, 37B are held in the folded portions 35A, 35B (refer to Japanese Patent Application No. 156189/1991).

However, these metallic gaskets have the following technical problems left unsolved. Namely, the metallic gasket 20 has a metallic plate 26 laminated on the side of the elastic metallic plate 21 on which the projecting surfaces of the beads 24A, 24B extend, for the purpose of regulating the thickness of the plate 21 but the portion of the plate 21 on which the metallic plate 26 is laminated is on the radially outer side of the beads and does not include the portions thereof on which the beads are formed. Accordingly, the portions of this metallic gasket on which the beads are formed consist basically of a single elastic metallic plate.

The above-mentioned metallic gasket 30 has a regulating plate 36 laminated on the regions of the elastic metallic plate 31 which correspond to the beads 34A, 34B and the regions of the plate 31 which are on the radially outer side of the beads 34A, 34B, for the purpose of regulating the strength of the elastic metallic plate but the portion of this metallic plate 31 on which this regulating plate 36 is laminated is on the side thereof on which the projecting surfaces of the beads 34A, 34B extend. The region of the plate 31 on which the regulating plate 36 is laminated are the portions thereof which correspond to the beads and the portion thereof which is on the radially outer side of the beads, and this regulating plate 36 is not laminated on the portions of the elastic metallic plate 31 which are on the radially inner side of the beads 34A, 34B.

Therefore, when the metallic gasket 30 is held between the joint surfaces of the cylinder head and cylinder block and tightened, a required difference in height is obtained between the folded portions 35A, 35B and the regions of the elastic metallic plate 31 which is on the outer side of the beads in the radial direction of the cylinder bore-aligned holes 32A, 32B. However, it is very troublesome to carry out a plate thickness control operation in which this difference in height is determined taking into consideration not only the thickness of the elastic metallic plate 31, the height of the beads 34A, 34B and the thickness of the folded portions 35A, 35B but also the thickness of the regulating plate 36, and a required difference in height has to be obtained by only forming the folded portions 35A, 35B. In addition, even if the minimization of a load stress in the beads and the prevention of a full compression of the beads are attained, it cannot be said that this metallic gasket has a sufficiently high durability.

SUMMARY OF THE INVENTION

An object of the present invention is to provide a metallic gasket capable of varying a resultant spring constant of two elastic metallic plates in accordance with the magnitude of the flexure of these metallic plates while securing the double seal portions, each of which consists of a bead and a folded portion, around cylinder bore-aligned holes, whereby, even when irregularity occurs in the joint surfaces of two structural members of an internal combustion engine during a structural member tightening operation, the beads and folded portions are deformed in accordance with the flexure of these joint surfaces to allow the irregularity thereof to be offset more easily; capable of carrying in a shared manner a fluctuating load, which occurs due to a repeated combustion cycle of the engine carried out while the metallic gasket is used in practice after the structural members have been tightened together, to minimize an amount of flexure of the cylinder head, whereby it is rendered possible to prevent a full compression of the beads owing to the provision of the folded portions, whereby the sealing effect of the metallic gasket is maintained at a higher level, prevent the entry of a high-temperature high-pressure combustion gas which causes the beads on the elastic metallic plate to be corroded and soiled, prevent the beads from being fatigued and cracked even when large fluctuating load stress occurs in the portion of the cylinder head which has the lowest rigidity, and lessen the fluctuating load stress occurring when the engine is started, operated and stopped; and capable of omitting a complicated plate thickness control operation which is required when an elastic metallic plate is laminated on the surface of another elastic metallic plate on which the projecting surfaces of the beads extend, whereby it is rendered possible to secure a required difference in height between the folded portion-carrying regions and bead-surrounding regions of the elastic metallic plate by forming the folded portions only, further reduce the load stress occurring in the beads and improve the durability of the metallic gasket.

When the bends on two elastic metallic plates laminated on each other in a conventional metallic gasket deviate even a little, the beads are deformed abnormally to cause the sealing effect of the gasket to lower. In the metallic gasket according to the present invention, the width of the beads on one metallic plate in the radial direction of the cylinder bore-aligned holes therein is set different from that of the beads on the other metallic plate so as to secure the sealing performance of the beads. If the shape of the beads on this metallic gasket is varied in accordance with the condition of different circumferential portions of the relative cylinder bore-aligned holes, beads suitable for the area of the region between adjacent cylinder bore-aligned holes can be obtained. If the structure of the folded portions of this metallic gasket is varied in accordance with the condition of different circumferential portions of the relative cylinder bore-aligned holes, a metallic gasket having sealing performance required in the regions among the cylinder bore-aligned holes and the other regions can be obtained.

This metallic gasket has a first elastic metallic plate provided with beads formed on the portions thereof which are spaced from the circumference of cylinder bore-aligned holes in the radially outward direction thereof, so as to extend along the circumferences of these holes, and folded portions positioned on the parts of the cylinder bore-aligned hole-surrounding regions which are on the inner side of the beads, and which are on the surface of the metallic plate on which the projecting surfaces of the beads extend; and a second elastic metallic plate laminated on the surface of the first elastic metallic plate on which the recessed surfaces of the beads thereon extend, and provided with beads adapted to be fitted in the recessed portions of the beads on the first metallic plate. Therefore, when this metallic gasket is put in a pressed state by tightening the same between a cylinder head and a cylinder block, i.e. two joint surface-carrying structural members, the first and second elastic metallic plates laminated on each other with the beads thereon engaged with each other are deformed due to the pressing force but the stress imparted to each metallic plate becomes smaller than that imparted to a conventional metallic gasket consisting of a single metallic plate. Accordingly, the metallic gasket in the present invention withstands stress easily, and the durability of the metallic gasket can be improved.

The beads form annular seal portions with respect to the joint surfaces of a cylinder head and a cylinder block, which seal members extend along circles spaced from the circumferences of the cylinder bore-aligned holes in the radially outward direction thereof. Since the thickness of a folded portion is about two times as large as that of the elastic metallic plate, the folded portion forms another seal member around the relative cylinder bore-aligned hole. Even when irregularity occurs on the joint surfaces of the two structural members during the tightening of the same structural members, the beads, second elastic metallic plate and folded portions are deformed in accordance with the flexure of the structural members, so that the irregular clearance between the contact surfaces is eliminated.

The irregularity between the joint surfaces is eliminated with the double seal members, which consists of beads and folded portions, secured around the cylinder bore-aligned holes, and the fluctuating load due to the repeated combustion cycle of the internal combustion engine is carried in a shared manner to minimize the amount of flexure of the cylinder head and enable the folded portions to prevent the beads from being fully compressed. Consequently, a decrease in the sealing effect of the metallic gasket can be prevented, and, especially, the stress occurring in the first elastic metallic plate can be reduced as compared with that occurring in a conventional metallic gasket consisting of a single elastic metallic plate. This enables the durability of the metallic gasket to be improved to a great extent.

In this metallic gasket, the two elastic metallic plates, i.e. the first and second elastic metallic plates display the characteristics of a leaf spring, and an overall spring constant $k_A$ equals the sum ($k_A = k_1 + k_2$) of a spring constant $k_1$ of the first elastic metallic plate and that $k_2$ of the second elastic metallic plate. Although the relation between the thickness of the first elastic metallic plate and that of the second elastic plate is not specially limited, a total thickness of the metallic gasket is limited to a certain level. The first elastic metallic plate is produced by forming beads on a raw elastic metallic plate, and thereafter heat-treating the resultant plate so as to secure a predetermined hardness, and the second elastic metallic plate preferably by forming beads and folded portions on a raw elastic metallic plate, and thereafter heat-treating the resultant plate so as to secure a predetermined hardness, the second elastic metallic plate being able to be produced without subjecting a bead- and folded portion-carrying elastic metallic plate to heat treatment in some cases.

Since the synergetic effect of the increased number of annular seal members and elimination of irregularity of the above-mentioned joint surfaces carries in a shared manner a fluctuating load occurring due to the repetition of a combustion cycle of an internal combustion engine, the amount of flexure of the cylinder head can be minimized. Since the second elastic metallic plate is laminated over the whole surface of the bead-carrying first elastic metallic plate so as to form a double structure, the resistance of the gasket to stress becomes high as compared with that of a gasket consisting of a single elastic metallic plate, so that the durability of the gasket is improved. The most advantageous conditions for the first and second elastic metallic plates with respect to stress are that both of these metallic plates have the same thickness and spring constant. The first elastic metallic plate enables a full compression of the beads to be prevented, the second elastic metallic plate to be reinforced, fluctuating load stress, which occurs in the beads when the internal combustion engine is started, operated and stopped, to be reduced, and the occurrence of permanent set in fatigue of and cracks in the beads to be prevented. Since the folded portions are formed integrally with a metallic gasket body, the metallic plates do not deviate when they are tightened together and used in practice.

If the first elastic metallic plate is merely provided with beads on the portions thereof which are spaced from the circumferences of cylinder bore-aligned holes in the radially outward direction thereof so that the beads extend along the same circumferences, and folded portions formed by folding back the circumferential parts of the cylinder bore-aligned holes in the radially outward direction thereof so that the folded portions extend between the same circumferences and beads, a difference in thickness which corresponds to the thickness of an elastic metallic plate occurs between the folded portions and the portions positioned on the radially outer side of the beads. When this difference is not higher than a required level, the quantity of deformation of the beads is limited when the metallic gasket is inserted between the cylinder head and cylinder block and tightened, so that a required level of sealing force cannot be obtained. However, since this metallic gasket has soft members held in the folded portions, such a difference as mentioned above can be regulated to an arbitrary level by suitably compressing these soft members held in the folded portions, and, accordingly, the face-to-face pressures of the folded portions and beads around the cylinder bore-aligned holes, and such pressures of the portions around the water holes and oil holes can be ideally regulated.

In a metallic gasket consisting of elastic metallic plates the outer surfaces of which are coated with a non-metallic material, such as heat- and oil-resisting rubber or resin, the direct metal-to-metal contact between the gasket and cylinder head and cylinder block is avoided. Therefore, the corrosion and soiling of the metal surfaces are prevented, and the sufficient sealing function of the gasket with respect to the uneven surfaces (machined surfaces) of the cylinder head and cylinder block is secured.

In a metallic gasket having folded portions formed to a larger thickness among the cylinder bore-aligned holes and to a smaller thickness at the parts thereof which are other than the parts among the cylinder bore-aligned holes, the parts of the gasket which are among the adjacent cylinder bore-aligned holes are liable to be warped most greatly when the cylinder head is bent bat the folded portions formed to a larger thickness among the cylinder bore-aligned holes are deformed and effectively offset such flexure of the gasket. This can prevent a decrease in the sealing effect of the gasket, and the entry of a high-temperature and high-pressure gas, which causes the beads on the metallic gasket to be corroded and soiled, into the narrow clearance around the beads.

When a regulating plate, which is used for the purpose of regulating the thickness of the first elastic metallic plate in this metallic gasket, is laminated on the surface of the first elastic metallic plate on which the projecting surfaces of the bead extend, in such a manner that the regulating plate extend in the radially outward direction of the beads, a difference in height of a level not lower than a required level between the beads and the regions of the same elastic metallic plate which are on the radially outer side of the beads can be regulated.

Accordingly, the entry of a high-temperature high-pressure gas into the clearance around the beads, which ceases the beads to be corroded and soiled is prevented. Moreover, even large fluctuating load stress occurring in the portion of the cylinder head which has the lowest rigidity does not cause the beads to be corroded and cracked, and the amount of flexure of the cylinder head occurring when the internal combustion engine is started, operated and stopped is minimized, whereby the fluctuating load stress based on the flexure can be reduced. Therefore, this metallic gasket is helpful in preventing the occurrence of permanent set in fatigue of and cracks in the beads, and enables the durability of the beads to be improved. Owing to these advantageous points, this gasket secures an effect superior to that of a conventional metallic gasket. When the second elastic metallic plate is laminated on the first elastic metallic plate with the projecting surfaces of the beads on one plate fitted in the recessed surfaces of the beads on the other, a troublesome plate thickness control operation for suitably setting the thickness and height of the folded portions, beads and first elastic metallic plate can be omitted, and a required difference in height referred to above is obtained by only forming folded portions on the first elastic metallic plate. Namely, the controlling of the plate thickness can be done simply, and the load stress in the beads can be further reduced, whereby the durability thereof can be improved.

In the metallic gasket having soft members held in the folded portions of the elastic metallic plate, the quantity of deformation of the beads can be set large as compared with that for a metallic gasket having no soft members held in the folded portions. Namely, since the folded portions are formed by folding back predetermined parts of the metallic plate with soft members held in the folded parts, a difference in height, which corresponds to the thickness of the elastic metallic plate, between the folded portions and the elastic metallic plate can be regulated so that the thickness of the folded portions becomes large. Therefore, since the thickness of the folded portions increases, the distribution of face-to-face pressure in the metallic gasket can be corrected properly, and the face-to-face pressure of the folded portion and that of the beads can be balanced with each other. In addition, the face-to-face pressures of the folded portions and beads around the cylinder bore-aligned holes, and those of the portions of the gasket which are around the water holes and oil holes can be ideally regulated.

In the case where each bead on an elastic metallic plate is formed so as to have cross-sectionally arcuate top portions of the parts thereof which are between cylinder bore-aligned holes and cross-sectionally flat top portions at the other parts thereof, the spring constant of the flat top-carrying bead portions becomes relatively smaller than that of the bead portions among the cylinder bore-aligned holes. Therefore, when the metallic gasket is tightened between the joint surfaces of the cylinder head and cylinder block, the force for tightening the bead portions among the cylinder bore-aligned holes becomes larger accordingly than that for tightening the other bead portions, so that the sealability of the bead portions among the cylinder bore-aligned holes can be improved.

When the thickness of the parts of the folded portions of the elastic metallic plate which are between adjacent cylinder bore-aligned holes is set larger than that of the other parts thereof, the folded portions can effectively deal with the flexure of the structural material forming the portions, which define the adjacent cylinder bore-aligned holes, of the metallic plate, and the sealability of the folded portions can be improved. Since the range of extension of the folded portions can be set arbitrarily as long as the folded portions do not overlap the beads on the base plate, the distribution of the face-to-face pressures of the beads and folded portions can be regulated in the design stage.

When a regulating plate extending to the regions which are on the radially outer side of the beads is laminated on the surface of the elastic metallic plate on which the projecting surfaces of the beads extend, it enables a difference in height between the folded portions and the regions on the radially outer side of the beads to be minimized. Accordingly, the difference in thickness between the regions around the cylinder bore-aligned holes and the regions on the radially outer side of the beads can be regulated.

If a non-metallic material, such as heat- and oil-resisting rubber or resin is applied to both surfaces of this metallic gasket, the direct metal-to-metal contact of the gasket with the cylinder head and cylinder block is avoided, and the resistance to a corrosive combustion gas, durability and accuracy of the gasket are secured. This enables the corrosion and soiling of the metal surface to be prevented, and a satisfactory function of the gasket with respect to an uneven surface (machined surface), if any, of the cylinder head and cylinder block to be secured.

In this metallic gasket, a first elastic metallic plate provided with beads formed on the portions thereof which are spaced from the circumferences of the cylinder bore-aligned holes in the radially outward direction thereof so that these beads extend among the circumferences of the same holes, and folded portions formed on the surface of the metallic plate on which the projecting surfaces of the beads extend, in such a manner that the folded portions are positioned around the cylinder bore-aligned holes and on the inner side of the beads, and a second elastic metallic plate provided with beads engageable with those on the first plastic metallic plate are laminated on each other. Therefore, when these metallic plates are pressed by tightening the same, double annular seal members with respect to the opposite joint surfaces are formed at the portions of the metallic plates which correspond to the inner and outer edges, with respect to the radial direction of the cylinder bore-aligned holes, of the beads on these plates since the projecting portions of the beads on these plates are engaged with each other. Since the thickness of the folded portions is about two times as large as that of the first elastic metallic plate, these folded portions are laminated on the portions of the second elastic metallic plate which surround the cylinder bore-aligned holes to form another annular seal members around the same holes. Accordingly, when the beads join adjacent beads among the cylinder bore-aligned holes, four seal lines are formed in the mentioned regions, and three seal lines in the regions other than the same regions. Even if irregularity occurs between the joint surfaces of the two structural members of the engine during a gasket tightening operation, the beads, second elastic metallic plate and folded portions are deformed in accordance with the flexure of the joint surfaces to eliminate an irregular clearance between these contact surfaces.

When this metallic gasket is pressed by tightening the same between the cylinder head and cylinder block, i.e. two joint surface-carrying structural members, the first and second elastic metallic plates are deformed due to the pressing force but the beads thereon, which are engaged at their projecting portions with each other, form double annular seal members with respect to the joint surfaces at the parts of these elastic metallic plates which correspond to the inner and outer edges, with respect to the radial direction of the cylinder bore-aligned holes, of the beads on the two plates.

The first and second elastic metallic plates in this metallic gasket display the characteristics of a leaf spring, and have properties of springs series-arranged so that an inverse number of an overall spring constant equals the sum of inverse numbers of the spring constants of the respective springs. Namely, the first elastic metallic plate is compressed first and deformed until it has reached its yielding point, and the subsequent flexure of the spring of a smaller thickness occurring after this yielding point causes the second elastic metallic plate of a larger thickness to be warped with its high spring constant, whereby preferable spring characteristics are displayed at every point in time in a plate tightening step.

Since an increased number of annular seal members are provided, a fluctuating load occurring due to the repetition of a combustion cycle of the internal combustion engine is carried in a shared manner owing to the synergetic effect of these seal members and the above-mentioned actions of various parts in eliminating the irregularity of the joint surfaces. Since the second elastic metallic plate is laminated on the whole surface of the first elastic metallic plate with the projecting portions of the beads on both thereof engaged with each other to form a double structure, this metallic gasket withstands stress more easily than a metallic gasket consisting of a single elastic metallic plate. The most advantageous conditions for the production of a metallic gasket satisfactorily resistant to stress are that two elastic metallic plates of the same thickness be laminated. Since the folded portions are integral with a metallic gasket body, they do not deviate when the gasket is tightened and used in practice.

Since the width, with respect to the radial direction of the cylinder bore-aligned holes, of the beads on the first elastic metallic plate is set larger than that of the beads on the second elastic metallic plate, the contact condition of the projecting portions of the corresponding beads on these plates is maintained properly even when the opposite beads are displaced a little.

If the width, with respect to the radial direction of the cylinder bore-aligned holes, of the beads on the first elastic metallic plate is set uniformly large with the width, with respect to the radial direction of the cylinder bore-aligned holes, of the beads on the second elastic metallic plate set smaller at the parts thereof which are among the cylinder bore-aligned holes and larger at the other parts thereof, the deviation of the beads in the regions which are among the cylinder bore-aligned holes, and which severely demand high sealing performance, can be avoided reliably, and a decrease in the sealing performance of the beads is prevented, so that sufficiently high sealing performance can be secured stably in such regions even in an internal combustion engine in which the distance between adjacent cylinder bore-aligned holes is small.

Therefore, in the case where adjacent beads join each other among the cylinder bore-aligned holes, four seal lines are formed, whereby reliable seals can be provided in the regions among the cylinder bore-aligned holes in which a large sealing force is required. Three seal lines are formed in the regions other than the regions among the cylinder bore-aligned holes, and reliable seals can also be provided in this three-seal-line regions. Since the folded portions are integral with the metallic gasket body, they do not deviate when the gasket is tightened and used in practice.

The two elastic metallic plates, i.e. the first and second elastic metallic plates display the characteristics of a leaf spring, and have properties of springs series-arranged so that an inverse number of an overall spring constant equals the sum of inverse numbers of the spring constants of the respective springs. In general, a spring constant is proportional to the cube of the thickness of a plate. Accordingly, when there is a sufficiently large difference between the thickness of one metallic plate and that of the other, an overall spring constant becomes close in theory to a spring constant of a plate of a smaller thickness. During the initial flexure of the gasket, the spring of a smaller thickness, i.e. the first elastic metallic plate is compressed first and deformed until it has reached its yielding point, and the subsequent flexure of the spring of a smaller thickness occurring after this yielding point causes the second elastic metallic plate of a larger thickness to be warped with its high spring constant, whereby preferable spring characteristics are displayed at every point in time in a plate tightening step. Namely, even when irregularity occurs on the joint surfaces of two structural members of the engine during a metallic gasket tightening operation, the beads, second elastic metallic plate and folded portions are deformed excellently as mentioned above, in accordance with the flexure thereof to eliminate irregular clearances between the contact surfaces. When the gasket is used in practice after the tightening operation has been completed, it is held between the joint surfaces with a large tightening force in a reliable manner owing to its resultant spring constant high enough to deal with the deformation of mainly the elastic metallic plate of a higher spring constant, and the follow-up behavior with respect to the movement of the cylinder head of the gasket is improved owing to the series-arranged structure of the beads.

Since this metallic gasket is provided with an increased number of annular seal members, each seal carries in a shared manner a fluctuating load occurring due to the repetition of the combustion cycle of the internal combustion engine to minimize the amount of flexure of the cylinder head and prevent a full compression of the beads. This enables a decrease in the sealing effect of the gasket to be prevented. In this gasket, the stress occurring in the elastic metallic plates are reduced more greatly than in a gasket consisting of one elastic metallic plate, so that the durability of the gasket is improved. Therefore, the entry of a high-temperature and high pressure combustion gas, which causes the beads on the elastic metallic plates to be corroded and soiled, into the clearances between contact surfaces is prevented, and, even when a large fluctuating load stress occurs in the portion of the cylinder head which has the lowest rigidity, the beads are not fatigued and cracked. Consequently, the amount of flexure of the cylinder head occurring when the internal combustion engine is started, operated and stopped is minimized, so that the fluctuating load stress based on the flexure mentioned above can be reduced. Since the elastic metallic plates are laminated on each other so that the projecting portions of the beads on one of them contact those of the beads on the other, a complicated operation for controlling the thickness and height of the folded portions, beads and metallic plates is omitted, and a required difference in height between the folded portions and bead-surrounding portions is obtained mainly by forming the folded portions alone. This enables the thickness of plates to be controlled simply, the load stress in the beads to be further reduced and the durability of the gasket to be improved.

In the metallic gasket, the beads on one elastic metallic plate and those on the other are engaged with each other at the projecting portions thereof, and the width, with respect to the radial direction of the cylinder bore-aligned holes, of the beads on one elastic metallic plate is set larger than that of the beads on the other. Therefore, even if the beads on these plates deviate a little from each other When the plates are coined, the beads are not abnormally deformed, and there is not a possibility that such a little deviation of the beads causes the sealability of the gasket to lower. Accordingly, even when the positions of the beads on the two plates deviate a little, the projecting portions thereof are kept engaged.

If the width, with respect to the radial direction of the cylinder bore-aligned holes, of the beads on one elastic metallic plate is set uniformly large with the width, with respect to the same direction, of the beads on the other elastic metallic plate set smaller at the parts thereof which are among the cylinder bore-aligned holes and larger at the other parts thereof, the deviation of the beads in the regions which severely demand high sealing performance, and which are among the cylinder bore-aligned. holes can be avoided reliably, and the lowering of the sealing performance of the bead is prevented. Such an effect in obtaining a sufficiently large sealing force stably in the regions among the cylinder bore-aligned holes becomes markedly large in, especially, an internal combustion engine having a small distance between adjacent cylinder bore-aligned holes.

The folded portions, which are formed, heat-treated and then used in practice, can be made freely, i.e., they can be made by suitably changing the width thereof in the radial direction of the cylinder bore-aligned holes. For example, the thickness of the parts of the folded portions which are between adjacent cylinder bore-aligned holes can be set larger than that of the other parts thereof. Since flexure is liable to occur most greatly between adjacent cylinder bores when the cylinder head is bent, a combustion gas is liable to enter most the clearances among the cylinder bore-aligned holes. When the metallic gasket is tightened, a large tightening force is obtained at the parts thereof which are among the cylinder bore-aligned holes. Consequently, it becomes possible to improve the sealability of the gasket, and prevent the corrosion and soiling of the beads.

DESCRIPTION OF THE PREFERRED EMBODIMENTS

The embodiments of the metallic gasket according to the present invention will now be described with reference to the drawings.

Figure 1:
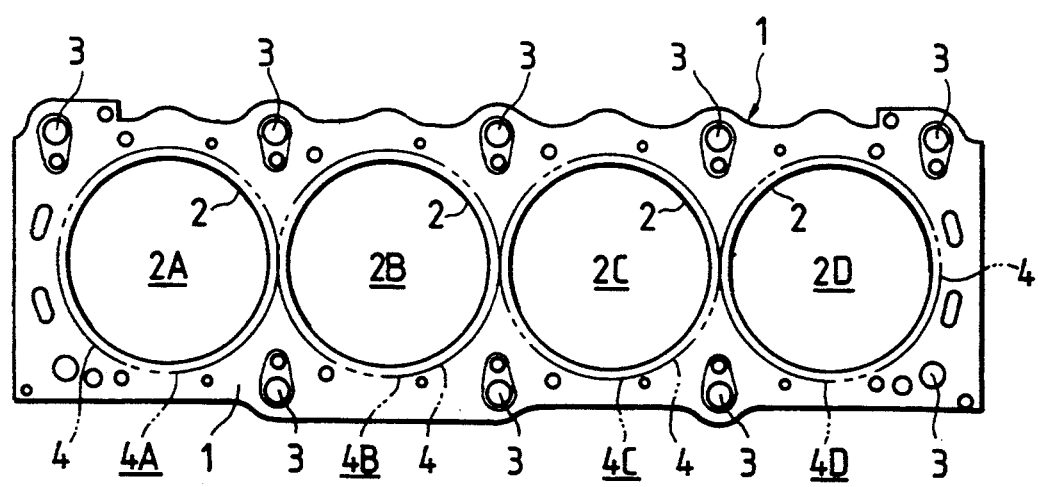
FIG. 1 is a plan view of an embodiment of the metallic gasket according to the present invention.
Figure 2:
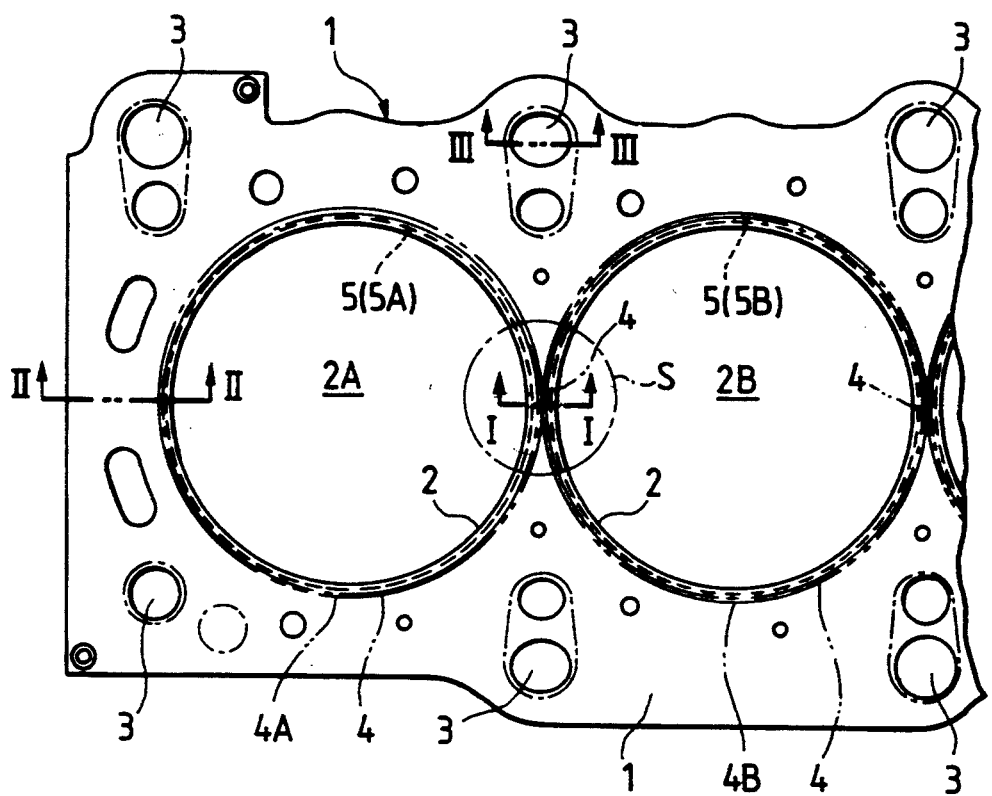
FIG. 2 is an enlarged plan view showing in detail a part of the metallic gasket of FIG. 1.
Figure 3:
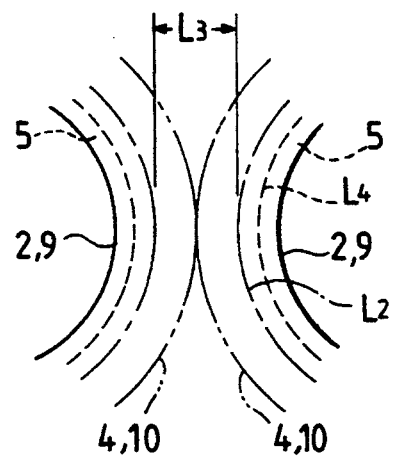
FIG. 3 is an enlarged plan view showing in detail a part of the metallic gasket of FIG. 2.

Referring to FIGS. 1 and 2, this metallic gasket is used to seal the opposite joint surfaces of a cylinder head and a cylinder block of a four-cylinder engine. The metallic gasket shown in FIGS. 4, 5 and 6 consists of a lower bead plate 1 composed of a first single elastic metallic plate, and an upper bead plate 8 composed of a second elastic metallic plate.

The lower bead plate 1 is produced by subjecting, for example, a plate material of a hardness of not more than Hv 200 to a folding step and a bead forming step, and then to a heat treatment in principle but a folded and bead-formed plate may be used as it is without being heat-treated. When a heat treatment step is not used, a plate of SUS304, aluminum alloy, copper alloy or soft steel is used. When a beat treatment step is used, a plate of SUS630 or SUS631 to be precipitation hardened, a plate of SUS304, SUS301 or a SK material (SK1-7) to be nitrided, a plate of SUS420J$_2$ or SUS440A to be quenched and tempered, or a plate of titanium alloy or aluminum alloy to be solid-solution heat-treated is used. The hardness of a raw material not yet subjected to formation of beads shall have a hardness of, for example, not more than Hv 200. The thickness of the lower bead plate 1 is in the range of 0.1 mm-0.20 mm.

The following are concrete examples of hardness of metallic materials for the upper bead plate 8 which are subjected to various heat treatments. The hardness of nitrided SUS304 and SUS301 not yet heat-treated is not more than Hv 200 (surface only), and those of the same which have been heat-treated Hv 350-400 and Hv 350-500 respectively. The hardness of bead-processed SUS631 not yet heat-treated is not more than Hv 200, and that of the same which has been heat-treated, i.e., precipitation hardened Hv 350-500. Besides these materials, the heat-treating of a SK material (SK1-7), the quenching and tempering of SUS420J$_2$ and the solid-solution heat-treating of titanium alloy or aluminum alloy (6Al-2Sn-4Zr-6Mo) can also be done. The thickness $t_3$ of the upper bead plate 8 is in the range of 0.20 mm-0.35 mm.

The lower and upper bead plates 1, 8 in this metallic gasket are provided with cylinder bore-aligned holes 2A, 2B, 2C, 2D; 9A, 9B, 9C, 9D which correspond to the four cylinder bores made in a cylinder block (refer to FIG. 1, and general reference numerals for these cylinder bore-aligned holes are 2 or 9). The cylinder bore-aligned holes 2A, 9A are formed to the same size in the same portions of the bead plates, and the same applies to the remaining cylinder bore-aligned holes. The lower and upper bead plates 1, 8 are provided with water holes 3 for passing cooling water therethrough, oil holes and oil returning holes for passing oil therethrough, knock holes and rivet holes all of which are formed plurally to the same sizes and in the same portions thereof but the descriptions of these holes are omitted since these holes belong to known techniques.

If both the upper and lower surfaces of the metallic gasket, i.e. the bead-projecting surface of the lower bead plate 1 and the bead-recessed surface of the upper bead plate 8 are coated to a thickness of, for example, around 10-50 $\mu$m with a non-metallic material, such as heat- and oil-resisting rubber (for example, fluororubber) and resin, the metal-to-metal contacting condition of the gasket with respect to a cylinder head and a cylinder block can be avoided, and sufficiently high corrosion resistance, durability and strength of the gasket can be secured. Even when the mechanical surfaces of the metallic gasket are uneven, such a non-metallic material covering these uneven surfaces fulfills its sealing function satisfactorily.

Figure 4:
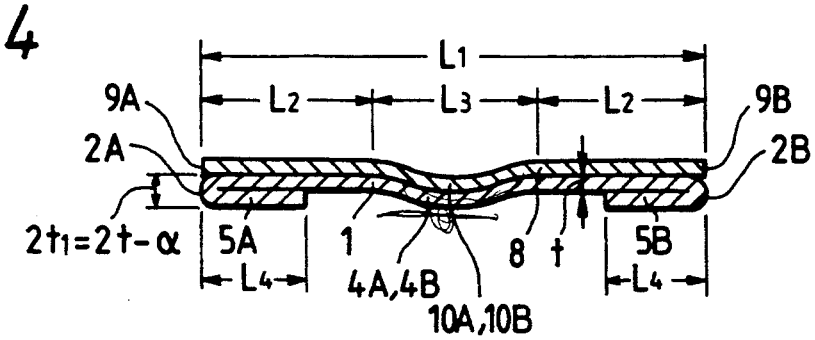
FIG. 4 is a sectional view of the embodiment of the metallic gasket according to the present invention, which is taken along the line I—I in FIG. 2.
Figure 5:
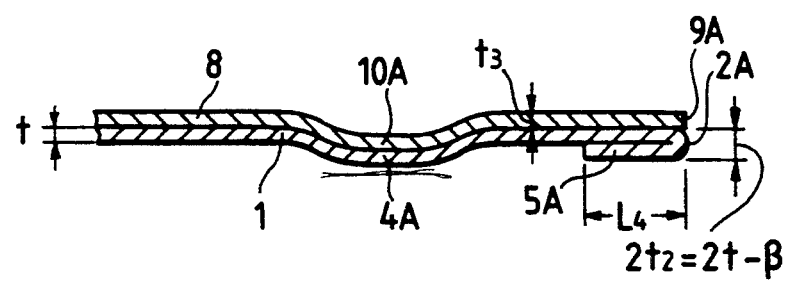
FIG. 5 is a sectional view of the embodiment of the metallic gasket according to the present invention, which is taken along the line II—II in FIG. 2.

FIG. 4 is a sectional view of a boundary portion, which is between adjacent cylinder bore-aligned holes 2A, 2B; 9A, 9B, of the metallic gasket taken along a line connecting the centers of the cylinder bore-aligned holes 2A, 2B; 9A, 9B, i.e. a sectional view of the portion of the metallic gasket which is between the cylinder bore-aligned holes 2, 9, and the boundary portions between the other adjacent cylinder bore-aligned holes 2, 9 have, of course, the same cross-sectional construction. FIG. 5 is a sectional view of the metallic gasket taken along a line connecting the cylinder bore-aligned holes 2A, 9A and an end portion, i.e. an edge portion of the metallic gasket, and the portion of the gasket which is between the cylinder bore-aligned holes 2D, 9D, which are provided on the opposite side of these holes 2A, 9A, and the relative edge portion of the gasket has the same cross-sectional construction. Not only these portions but also the portions around the cylinder bore-aligned holes 2, 9 except the boundary portions between adjacent holes 2, 9 have the same cross-sectional construction.

Figure 6:
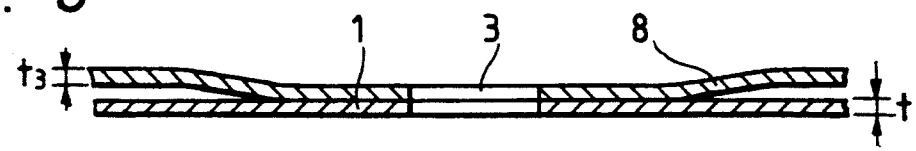
FIG. 6 is a sectional view of the embodiment of the metallic gasket according to the present invention, which is taken along the line III—III in FIG. 3.

FIG. 6 is a sectional view of the metallic gasket taken along a line passing a water hole 3 for passing cooling water therethrough. The other water holes, oil holes and oil returning holes through which oil is passed, knock holes and rivet holes have, of course, the same cross-sectional construction.

A cross-sectionally mountain-shaped bead 4 (the reference numeral 4 is a number denoting the beads generally) concentric with a cylinder bore-aligned hole 2 and extending annularly around the portion of the lower bead plate 1 which is close to and surrounds the hole 2 is formed in the same plate 1. In the illustrated embodiment, the bead 4 starts in a position a distance $L_2$ (for example, about 2.9 mm) away from the inner circumferential edge of the cylinder bore-aligned hole 2, and has a predetermined width $L_3$ in the radial direction of the hole 2 of about 2 mm, the height of this bead 4 being 0.2–0.25 mm. A distance $L_1$ between adjacent cylinder bore-aligned holes 2 is, for example, about 7.8 mm, and the bead 4A around the cylinder bore-aligned hole 2A and the bead 4B around the adjacent cylinder bore-aligned hole 2B join each other on the portion of the gasket in which the holes 2A, 2B extend close to each other. Such adjacent beads may be arranged with a very narrow clearance left therebetween without joining them together. The portions of the lower bead plate 1 which are around the cylinder bore-aligned holes 2 therein are provided with folded portions 5A, 5B bent backward onto the surface of the plate 1 on which the projecting surface of the bead 4 extends, in such a manner that the folded portion 5 does not overlap the bead 4 in a position on the radially inner side of the bead 4 (the reference numeral 5 is a number denoting the folded portions generally). The width $L_4$ of the folded portion 5 is, for example, about 2.5 mm. As shown in FIG. 6, the portion of the metallic gasket which is around a water hole 3 is cross-sectionally so formed that it extends concentrically with the hole 3 from a flat part thereof at a small angle so that the outer part of this water hole-surrounding portion is in the shape of a dent (or mountain), and this enables excellent sealing performance to be obtained around the hole 3 when the gasket is tightened.

In order to regulate the thickness of the folded portion 5 provided on the lower bead plate 1, a predetermined level of compressive force is applied to the folded portion 5 to form it to a predetermined thickness $2t_1$ ($=2t-\alpha$). In the cylinder bore-aligned hole-surrounding region except the portion thereof which is between the cylinder bore-aligned holes 2, the thickness of the plate is reduced by B which is larger than ($2t_2=2t-B$). The rigidity of the cylinder head is lower than that of the cylinder block, and, in a multicylinder engine, the portions of a gasket which are among its cylinder bore-aligned holes 2 are liable to be warped most greatly due to the fluctuation of a load in the explosion and expansion strokes in a combustion cycle in the internal combustion engine. Therefore, the sealing performance of this portion of the metallic gasket is liable to lower most greatly. Accordingly, the folded portion 5 is formed so that the thickness $2t_1$ of the part thereof which is between the cylinder bore-aligned holes 2 and shown in FIG. 4 is larger than that $2t_2$ (wherein $\alpha<\beta$) of the other parts thereof shown in FIG. 5.

Figure 27:
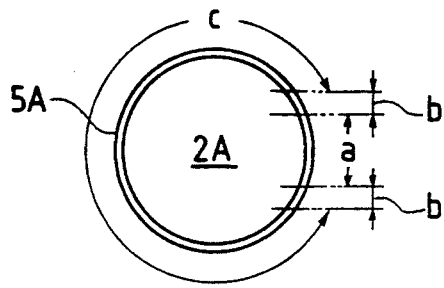
FIG. 27 illustrates the distribution of thickness of a folded portion around the circumference of a cylinder bore-aligned hole in a metallic gasket.
Figure 28:
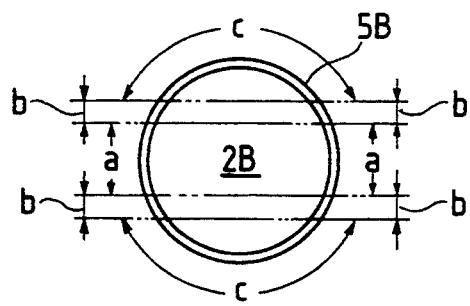
FIG. 28 illustrates the distribution of thickness of folded portions around the circumferences of adjacent cylinder bore-aligned holes.
Figure 29:
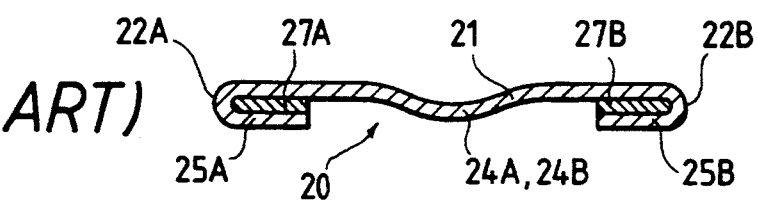
FIG. 29 is a sectional view of an example of metallic gasket in a prior application of the applicant of the present invention.
Figure 30:
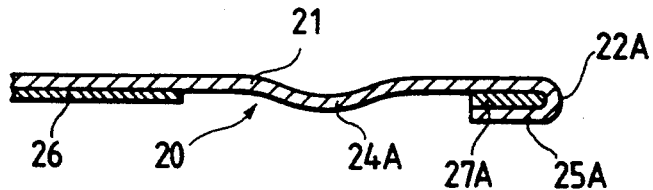
FIG. 30 is a sectional view of another part of the metallic gasket of FIG. 29.
Figure 31:
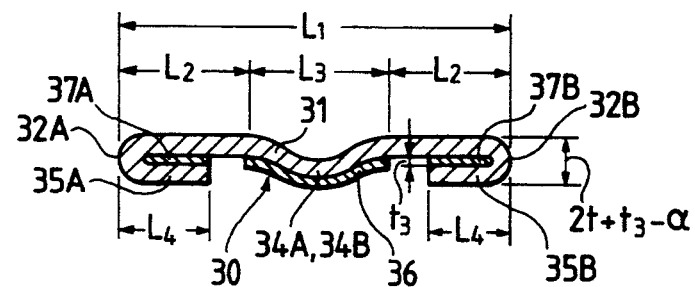
FIG. 31 is a sectional view of another example of metallic gasket in a prior application of the same applicant.
Figure 32:
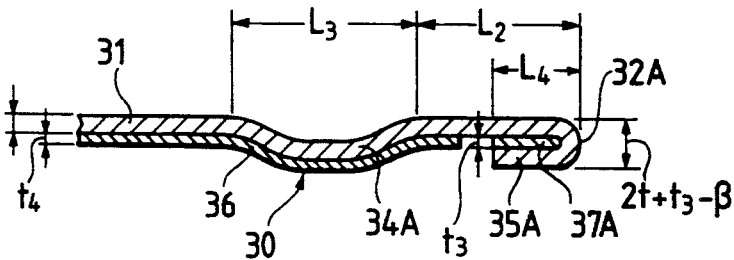
FIG. 32 is a sectional view of another part of the metallic gasket of FIG. 31.

Concretely speaking, the parts in regions a between the cylinder bore-aligned holes 2 are formed to a thickness $2t_1$ of 0.37 mm, the parts in regions b extending on both sides of the regions a to a gradually decreasing thickness, and the arcuate parts in regions c extending on both sides of the regions b to a thickness $2t_2$ of, for example, 0.32 mm, these regions a, b, c being shown in FIGS. 27 and 28. The lower bead plate 1 on which the folded portions 5 are formed is heat-treated so as to regulate the hardness thereof. This heat treatment is conducted so that the hardness of the plate in a non-bead-formed state of not more than Hv 200 increases to a level suitable for the kind of the plate 1.

In order to obtain, especially, the characteristics of series-arranged springs for the double elastic metallic plate in this metallic gasket formed as described above, and improve the durability of the gasket by omitting a complicated plate thickness control operation accompanying the laminating of a metallic plate on the elastic metallic plate and obtaining a required difference in height between the cylinder bore-aligned hole-surrounding regions and bead-surrounding regions by the formation of folded portions 5 alone whereby the load stress is further reduced, the upper bead plate 8 is laminated on the whole of the surface of the lower bead plate 1 on which the recessed surfaces of the beads 4 extend. The beads 10 on the upper bead plate 8 and those 4 on the lower bead plate 1 are projected in the same direction, and the projecting portions of the beads 10 are fitted in the recessed portions of the beads 4. In the metallic gasket shown in the drawings, the height of the beads 10 on the upper bead plate 10 is equal to that of the beads 4 on the lower bead plate 1, and the lower and upper bead plates 1, 8 have substantially the same surface area. The upper bead plate 8 is laminated on the lower bead plate 1. The distances $L_1$, $L_2$ and $L_3$ are equal to the corresponding distances on the lower bead plate 1. When the upper and lower bead plates 8, 1 are formed to the same thickness, the magnitude of stress to be supported thereby becomes equal, so that the bead plates are under the most advantageous stress resisting conditions.

When this metallic gasket is inserted between a cylinder head and a cylinder block and put in a pressed state by tightening the same with, for example, bolts inserted into the bolt holes 3, the beads 4 provided on the portions of the lower bead plate 1 which are close to the circumferences of the cylinder bore-aligned holes 2 come into contact with the joint surface of, for example, the cylinder head to form annular seal members. The folded portions 5 form annular seal members on the inner side of the annular seal members of the beads 4 with respect to the opposite joint surface of the cylinder head. The portions of the upper bead plate 8 which correspond to, especially, the folded portions 5 of the lower bead plate 1 forcibly contact the opposite joint surface of the cylinder block. The sealing pressure of the parts of the gasket which are provided with the folded portions 5 against the cylinder head and cylinder block becomes higher by a level corresponding to an increase in the thickness of the plate due to the folded portions 5. Owing to the double concentric annular seal members in plan of the metallic gasket, the leakage of a high-temperature and high-pressure combustion gas from the cylinder bore-aligned holes onto both of these joint surfaces can be prevented.

Even when irregularity occurs on the joint surfaces of the cylinder head and cylinder block during the tightening of these members, mainly the lower bead plate 1 is deformed in the vertical direction of the metallic gasket in an initial stage of flexure thereof during which the level of flexure is low, to eliminate the irregular clearance between the joint surfaces. Owing to such a laterally arranged increased number of annular seal members of the metallic gasket and the vertical action thereof to eliminate the irregularity of the joint surfaces, the amount of flexure occurring due to the repetition of the explosion and expansion strokes in a combustion cycle of the internal combustion engine is minimized. Since the folded portions 5 in addition to the beads 4 also contact the joint surface, the tightening force is carried jointly by the beads 4 and folded portions 5. When the gasket has been completely tightened, the resultant spring constant thereof is close to the spring constant of a spring of a high spring constant, i.e. the spring constant of the upper bead plate 8. Accordingly, the joint surfaces can be tightened firmly, so that the metallic gasket is deformed uniformly to cause the stress occurring in the beads to be uniformly reduced, and a full compression of the beads to be prevented. Even if the above-mentioned suppressed and repeated stress is exerted on the metallic gasket due to load fluctuation during an operation of the internal combustion engine, the load stress occurring in the beads 4 is reduced. Therefore, the occurrence of permanent set in fatigue of and cracks in the beads can be prevented.

Figure 7:
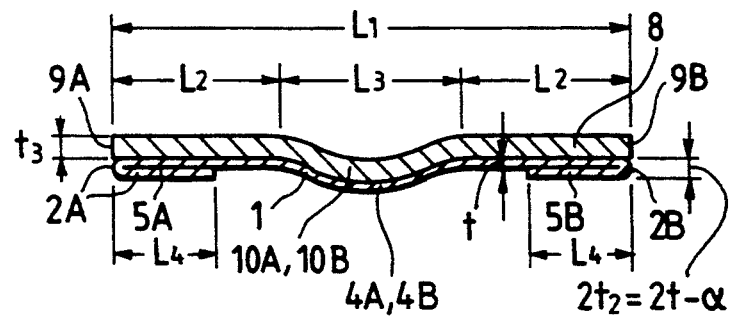
FIG. 7 is a sectional view, which corresponds to a drawing taken along the line I—I in FIG. 2, of another embodiment of the metallic gasket according to the present invention.
Figure 8:
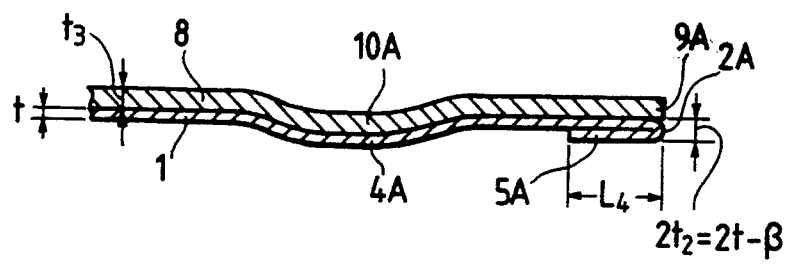
FIG. 8 is a sectional view, which corresponds to a drawing taken along the line II—II in FIG. 2, of the same embodiment of the metallic gasket according to the present invention.
Figure 9:
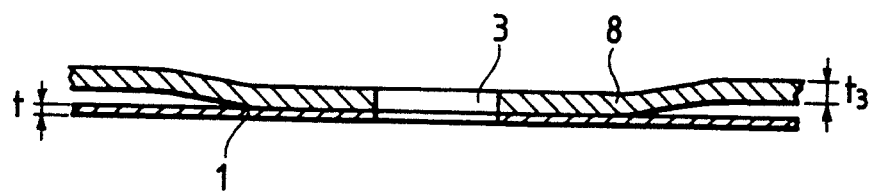
FIG. 9 is a sectional view, which corresponds to a drawing taken along the line III—III in FIG. 2, of the same embodiment of the metallic gasket according to the present invention.

Another embodiment of the metallic gasket according to the present invention will now be described with reference to FIGS. 7, 8 and 9. The metallic gasket shown in FIGS. 7, 8 and 9 has completely the same construction as that shown in FIGS. 4, 5 and 6 except that the thickness and spring constant of a lower bead plate 1 consisting of a first single elastic metallic plate and those of an upper bead plate 8 consisting of a second single elastic metallic plate are different, and the parts of the gasket of FIGS. 7, 8 and 9 which are identical with those of the gasket of FIGS. 4, 5 and 6 are therefore designated by the same reference numerals. As shown in FIGS. 7, 8 and 9, the upper bead plate 9 in this metallic gasket is formed to a thickness larger than that of the lower bead plate 1, and, for example, the thickness of the upper and lower bead plates 8, 1 is 0.25 mm and 0.12 mm respectively. Since the operation of the metallic gasket in this embodiment is substantially identical with that of the metallic gasket in the previous embodiment, a description thereof is omitted.

Figure 10:
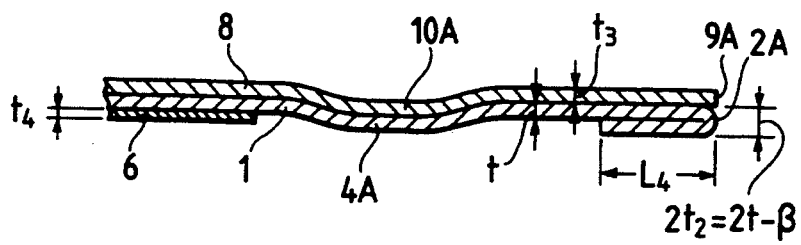
FIG. 10 is a sectional view, which corresponds to a drawing taken along the line II—II in FIG. 2, of still another embodiment of the metallic gasket according to the present invention.

In still another embodiment shown in FIG. 10, a metallic regulating plate 6 is laminated on a bead 4 on a lower bead plate 1 so as to reinforce the same plate 1. Namely, a plate thickness regulating plate 6 is laminated on the surface, on which the projecting surface of the bead 4 extends, of the region which is on the outer side, with respect to the radial direction of the relative cylinder bore-aligned hole 2, of the bead 4 formed around this hole 2. In the region between adjacent cylinder bore-aligned holes 2, there is no area which is on the outer side of the bead 4 with respect to both of the cylinder bore-aligned holes 2A, 2B, and the regulating plate 6 is not therefore laminated on this region. The regulating plate 6 is formed out of a hard material (Hv 350–500), such as SUS301 or SUS304, and has a thickness $t_4$ (for example, 0.10–0.20 mm) smaller than that $t$ (for example, 0.2–0.25 mm) of the lower bead plate 1. The regulating plate 6 is provided mainly for the purpose of regulating a difference in thickness of the part of the lower bead plate 1 in the metallic gasket which is around a cylinder bore-aligned hole 2, i.e. the part thereof which corresponds to a folded portion 5 and the part of the same bead plate 1 which is on the radially outer side of the bead 4. For example, when the thickness of the folded portion 5 does not change greatly around the cylinder bore-aligned hole 2 even by a precompression pressure applied to the gasket, the regulating plate 6 is laminated on the surface of the lower bead plate 4 on which the projecting surface of the bead 4 extends, so as to reduce the difference in height between the folded portion 5 and the region on the radially outer side of the bead 4. Since the regulating plate 6 consists of the above-mentioned hard material, the strength of the laminated part of the gasket including the bead 4 can be increased. The regulating plate 6 can also be provided with a protective function with respect to a face-to-face pressure occurring when the bead 4 contacts the opposite joint surfaces of the cylinder head and cylinder block.

Figure 11:
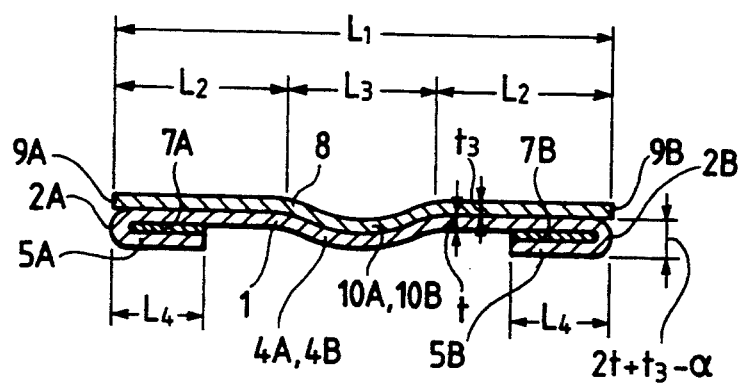
FIG. 11 is a sectional view, which corresponds to a drawing taken along the line I—I in FIG. 2, of the same embodiment of the metallic gasket according to the present invention.
Figure 12:
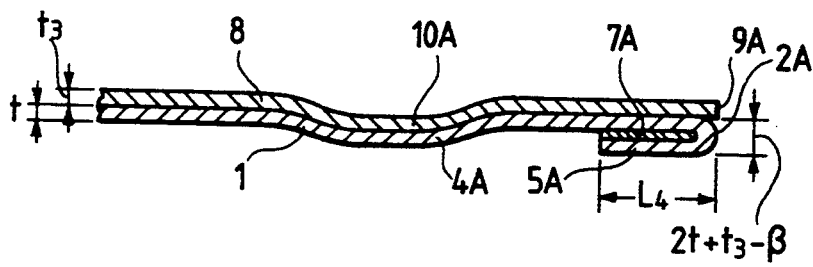
FIG. 12 is a sectional view, which corresponds to a drawing taken along the line II—II in FIG. 2, of the same embodiment of the metallic gasket according to the present invention.

FIGS. 11 and 12 are sectional views of a further embodiment the metallic gasket according to the present invention. Since the shape in plan and cross-sectional positions of and main constructional conditions for the parts of the metallic gasket in this embodiment are identical with those of and for the parts of the gasket in the previously-described embodiment shown in FIGS. 4 and 5, duplicated descriptions thereof are omitted. In the embodiment of FIGS. 11 and 12, soft metallic plates 7A, 7B (which will hereinafter be designated by a reference numeral 7 when they are referred to generically) constituting soft members of $t_3$ (for example, 100–200μ) in thickness are held in folded portions 5. Accordingly, the thickness of the folded portion 5 of the gasket to which a precompression pressure has been applied is $2t + t_3 - \alpha$ at the part thereof which is between adjacent cylinder bore-aligned holes 2, and $2t + t_3 - \beta$ at the cylinder bore-aligned hole-surrounding part except the part between the holes 2. Since B has a value larger than that of $\alpha$, the thickness $(2t + t_3 - \alpha)$ of the part between adjacent cylinder bore-aligned holes 2 is set larger than that $(2t + t_3 - \beta)$ of the cylinder bore-aligned hole-surrounding part except the above-mentioned part.

Regarding the soft metallic plate 7, it is possible to form various modified examples. Similar to the case of the folded portion 5, in which the thickness of a part thereof extending in a certain portion of the region surrounding the cylinder bore-aligned hole 2 and that of another part thereof extending in another portion of the same region may be set different as described previously with reference to FIGS. 27 and 28, a part of the soft metallic plate 7 which extends in a certain portion of the region surrounding the cylinder bore-aligned hole 2 may be omitted, or the thickness of this part and that of another part thereof extending in another portion of the same region may be set different. Namely, the soft metallic plate 7 may be formed to large thickness at only the part thereof which is between adjacent holes 2, and to a small thickness at the other part thereof which is exclusive of the above-mentioned part. Besides this example, for instance, the soft metallic plate 7 may be arranged correspondingly to the whole circumference of the folded portion 5, or only in the region between adjacent cylinder bore-aligned holes 2. In the step of forming the folded portion 5, which is carried out after the regulating plate 6 has been laminated on the elastic metallic plate 1, in the production of the metallic gasket in this embodiment, the soft metallic plate 7 is held in the folded portion 5, and a compressive force is applied to the resultant folded portion so as to form the same to a predetermined thickness. Finally, the elastic metallic plate 1 on which the folded portion 5 is formed and the soft metallic plate 7 held in the folded portion 5 are heat-treated to regulate the hardness thereof.

The soft metallic plate 7 is provided for the purpose of regulating a difference between the thickness of the region around a cylinder bore-aligned hole 2 and that of the region on the radially outer side of the relative bead 4. For example, when the thickness of the part of the folded portion 5 which is around the cylinder bore-aligned hole 2 decreases greatly during the precompression of the metallic gasket, the soft metallic plate 7 is laminated on the surface of the gasket on which the projecting surface of the bead 4 extends, and then held in the folded portion 5, whereby a difference in height between the folded portion 5 and the region on the radially outer side of the relative bead 4 is increased.

Figure 13:
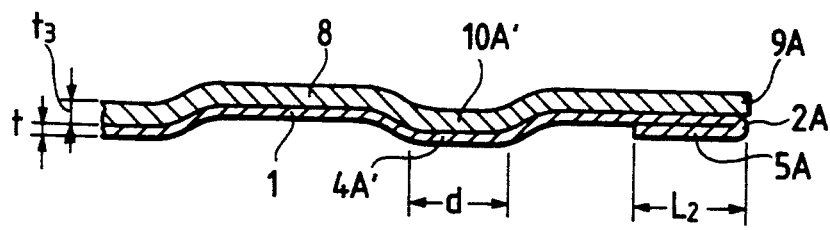
FIG. 13 is a sectional view, which corresponds to a drawing taken along the line II—II in FIG. 2, of a further embodiment of the metallic gasket according to the present invention.

A metallic gasket shown in FIG. 13 is a modified example of the second embodiment concerning the shape of the part of a bead which is in the region around a cylinder bore-aligned hole except the portion of the region which is between this hole and a hole adjacent thereto. The top portions of beads $4A'$, $10A'$ on the parts of lower and upper bead plates 1, 8 which are in this region are flattened so that the flattened top portions have a width d in the radial direction thereof, whereby the spring constant of the bead plates 1, 8 is reduced correspondingly. Since the shape of the bead $4'$ in the region between adjacent cylinder bore-aligned holes 2 is identical with that of the corresponding portion of a bead in the previously-described embodiment, a duplicated description thereof is omitted.

Figure 14:
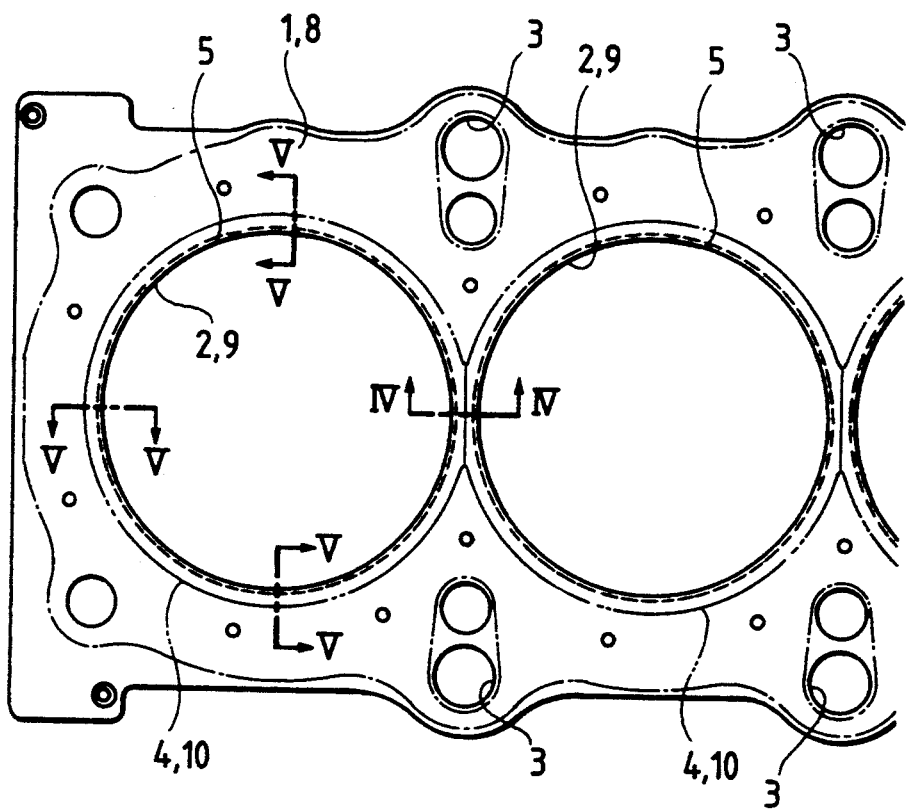
FIG. 14 is a plan view of another embodiment of the metallic gasket according to the present invention.
Figure 15:
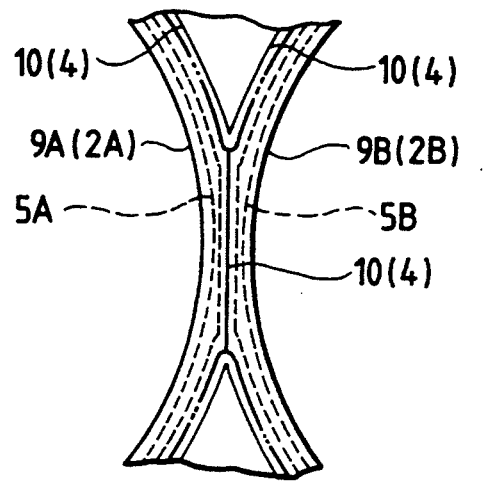
FIG. 15 is an enlarged plan view showing the portion of the metallic gasket of FIG. 14 which is between adjacent cylinder bore-aligned holes.

A further embodiment of the metallic gasket according to the present invention will now be described with reference to FIGS. 14 and 15. The elastic metallic plates used in this metallic gasket are identical with those in the previous embodiments, and, therefore, the same parts are designated by the same reference numerals to omit a duplicated description thereof. This metallic gasket consists of a first single elastic metallic plate and a second single elastic metallic plate, and is used for sealing the joint surfaces of a cylinder head and a cylinder block of, for example, a six-cylinder engine. This gasket will be described with the first and second elastic metallic plates positioned on the side of, for example, a cylinder block and a cylinder head respectively referred to as lower and upper bead plates 1, 8 respectively. The arrangement of these elastic metallic plates is not limited to that described above; it is a matter of course that the first and second elastic metallic plates may be arranged in a contrary manner, i.e., as upper and lower bead plates respectively.

In the illustrated example, the diameter of a cylinder bore-aligned hole is 85 mm, and a minimum distance between adjacent cylinder bore-aligned holes about 6 mm. The lower bead plate 1 consists of SUS631, and has a thickness t of 0.12 mm, which is preferably within the range of 0.1 mm–0.20 mm. The upper bead plate 8 consists of SUS631, and has a thickness t of 0.25 mm, which is preferably within the range of 0.20 mm–0.35 mm.

Figure 16:
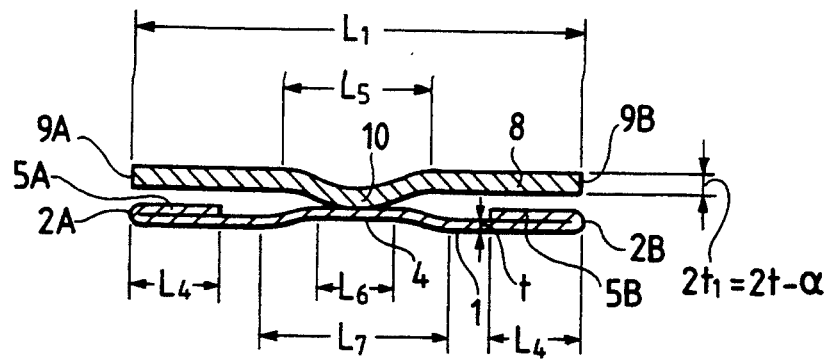
FIG. 16 is a sectional view taken along the line IV—IV in FIG. 14.
Figure 17:
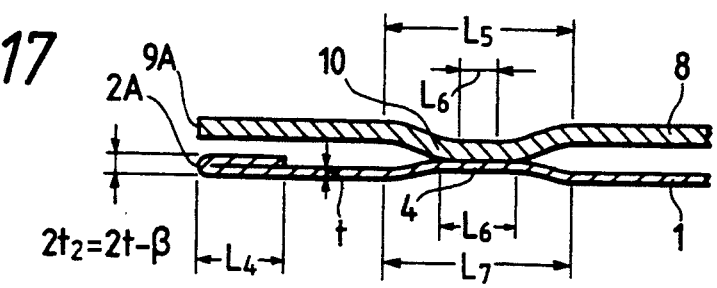
FIG. 17 is a sectional view taken along the line V—V in FIG. 14.

In a metallic gasket shown in FIGS. 16 and 17, a cross-sectionally mountain-shaped bead 4 extending concentrically with a cylinder bore-aligned hole 2 and surrounding the hole 2 annularly is formed on the region of a lower bead plate 1 which is close to and around the hole 2. In the illustrated example, a distance $L_1$ between adjacent cylinder bore-aligned holes 2 is, for example, about 6.0 mm. A bead 4 around a cylinder bore-aligned hole 2A and a bead 4 around an adjacent cylinder bore-aligned hole 2B join each other in the region in which the circumferences of the cylinder bore-aligned holes 2A, 2B are close to each other. Namely, the beads 4 meet each other to be formed into one common bead portion in the region between the cylinder bore-aligned holes. These adjacent beads 4 may also be arranged with a narrow clearance left therebetween without overlapping them. The width $L_7$ of the bead 4 in the radial direction thereof is about 2.5 mm, and the intermediate region $L_6$ of a width of 1.0 mm is formed substantially flat at its projecting top portion. The height of the bead 4 is 0.27 mm. The portions of the lower bead plate 1 which are around the cylinder bore-aligned hole 2 therein is provided with folded portions 5A, 5B which extend on the surface of the plate 1 on which the projecting surface of the bead 4 extends, and over the region of the same surface which is on the inner side of the bead 4 in the radial direction thereof so that the folded portions do not overlap the bead 4. The width $L_4$ of the folded portion 5 is, for example, about 1.2 mm. A water hole 3 may be cross-sectionally so formed that it has a surrounding portion concentric with the hole 3 and consisting of a flat inner part and an inclined outer part so as to form a slightly recessed (or mountain-shaped) surrounding portion, whereby a sealing force is obtained around the hole 3 when the gasket is tightened.

In this metallic gasket having the above-described construction, the upper bead plate 8 is laminated on the whole of the surface of the lower bead plate 1 on which the projecting surfaces of the beads 4 extend so as to obtain the characteristics of series-arranged springs in the double elastic metallic plate while securing a double seal member consisting of beads and folded portions, especially, around the cylinder bore-aligned holes, eliminate more easily the irregularity, which occurs on the opposite joint surfaces of two structural members of an engine, by the deformation of the beads and folded portions in accordance with the flexure of these joint surfaces, omit a troublesome plate thickness control operation accompanying the laminating of metallic plate on an elastic metallic plate, obtain a required difference in height between the folded portions and bead-surrounding portions by only forming the folded portions, further reducing load stress in the beads, and improve the durability of the gasket. In this gasket, the beads 10, 4 on the upper and lower bead plates 8, 1 are so formed that the projecting portions extend in the direction in which they are engaged with each other. In the illustrated preferable example, the thickness of the upper bead plate 8 is 0.25 mm which is about two times as large as that of the lower bead plate 1. The bead has a uniform height of 0.25 mm, which is equal to the thickness of the bead plate 1, around the cylinder bore-aligned hole. The width $L_5$ of the bead 10 is 2.0 mm at the part thereof which is between adjacent cylinder bore-aligned holes, and gradually increases at the other part thereof to reach up to around 2.5 mm at the part thereof which is in the position shown in FIG. 17. The upper bead plate 8 is laminated on the lower bead plate 1 with only the projecting portions of the beads 4, 10 contacting each other, and the other regions of the plates 8, 1 are kept spaced from each other. The upper bead plate 8 has substantially the same surface area as the lower bead plate 1.

When this metallic gasket is inserted between a cylinder head and a cylinder block and put in a pressed state by tightening the same with, for example, bolts inserted into the bolt holes 3, the beads 4 provided on the portions of the lower bead plate 1 which are close to the circumferences of the cylinder bore-aligned holes 2 come into contact with the joint surface of, for example, the cylinder head to form annular seal members. The folded portions 5 form annular seal members on the inner side of the annular seal members of the beads 4 with respect to the joint surface of the cylinder head. The portions of the upper bead plate 8 which correspond to, especially, the folded portions 5 of the lower bead plate 1 forcibly contact the opposite joint surface of the cylinder block. The sealing pressure of the parts of the gasket which are provided with the folded portions 5 against the cylinder head and cylinder block becomes higher by a level corresponding to an increase in the thickness of the plate due to the folded portions 5. Owing to the double concentric annular seal members in plan of the metallic gasket, the leakage of a high-temperature and high-pressure combustion gas from the cylinder bore-aligned holes onto both of these joint surfaces can be prevented.

Even when irregularity occurs on the joint surfaces of the cylinder head and cylinder block during the tightening of these members, mainly the lower bead plate 1 of a smaller thickness consisting of an elastic metallic plate of a lower spring constant is deformed in the vertical direction of the metallic gasket in an initial stage of flexure thereof during which the level of flexure is low, to eliminate the irregular clearance between the joint surfaces. Owing to such a laterally arranged increased number of annular seal members of the metallic gasket and the vertical action thereof to eliminate the irregularity of the joint surfaces, the amount of flexure occurring due to the repetition of the explosion and expansion strokes in a combustion cycle of the internal combustion engine is minimized. Since the folded portions 5 in addition to the beads 4 also contact the joint surface, the tightening force is carried jointly by the beads 4 and folded portions 5. When the gasket has been completely tightened, the resultant spring constant thereof is close to the spring constant of a spring of a high spring constant, i.e. the spring constant of the upper bead plate 8. Accordingly, the joint surfaces can be tightened firmly, so that the metallic gasket is deformed uniformly to cause the stress occurring in the beads to be uniformly reduced, and a full compression of the beads to be prevented. Even if the above-mentioned suppressed and repeated stress is exerted on the metallic gasket due to load fluctuation during an operation of the internal combustion engine, the load stress occurring in the beads 4 is reduced. Therefore, the occurrence of permanent set in fatigue of and cracks in beads can be prevented.

Since the width of the bead 10 on the upper bead plate 8 is set smaller than that of the bead 4 on the lower bead plate 1, these beads 4, 10 can be engaged with each other reliably even if these elastic metallic plates are combined with each other with the beads deviating slightly from each other. Accordingly, the abnormal deformation of the beads which causes the sealing performance thereof to lower does not occur. In the region between two adjacent cylinder bore-aligned holes, the folded portions 5A, 5B are positioned close thereto and on both sides thereof, so that a comparatively large sealing power can be secured. Therefore, the width of the part of the bead on the upper bead plate which is in this region is set smaller than that of the part of the same bead which is in the other region. Thus, the sealing performance of the bead is secured in accordance with the relative internal combustion engine by changing the width in the radial direction of the cylinder bore-aligned hole of the bead.

In order to regulate the thickness of the folded portion 5 formed on the lower bead plate 1, a predetermined level of compressive pressure is applied to the folded portion 5 to shape the same to a predetermined thickness $2t_1$ ($=2t-\alpha$). In the cylinder bore-aligned hole-surrounding region except the portion thereof which is between the cylinder bore-aligned holes 2, the thickness of the plate is reduced by $\beta$ which is larger than ($2t_2=2t-\beta$). The rigidity of the cylinder head is lower than that of the cylinder block, and, in a multicylinder engine, the portions of a gasket which are among its cylinder bore-aligned holes 2 are liable to be warped most greatly due to the fluctuation of a load in the explosion and expansion strokes in a combustion cycle in the internal combustion engine. Therefore, the sealing performance of this portion of the metallic gasket is liable to lower most greatly. Accordingly, the folded portion 5 is formed so that the thickness $2t_1$ of the part thereof which is between the cylinder bore-aligned holes 2 and shown in FIG. 16 is larger than that $2t_2$ (wherein $\alpha<\beta$) of the other parts thereof shown in FIG. 17.

Concretely speaking, the parts in regions a between the cylinder bore-aligned holes 2 are formed to a thickness $2t_1$ of the highest level, the parts in regions b extending on both sides of the regions a to a gradually decreasing thickness, and the arcuate parts in regions c extending on both sides of the regions b to a thickness $2t_2$ of the lowest level, these regions a, b, c being shown in FIGS. 27 and 28. The lower bead plate 1 on which the folded portions 5 are formed is heat-treated so as to regulate the hardness thereof. This heat treatment is conducted so that the hardness of the plate in a non-bead-formed state of not more than Hv 200 increases to a level suitable for the kind of the plate 1.

Figure 18:
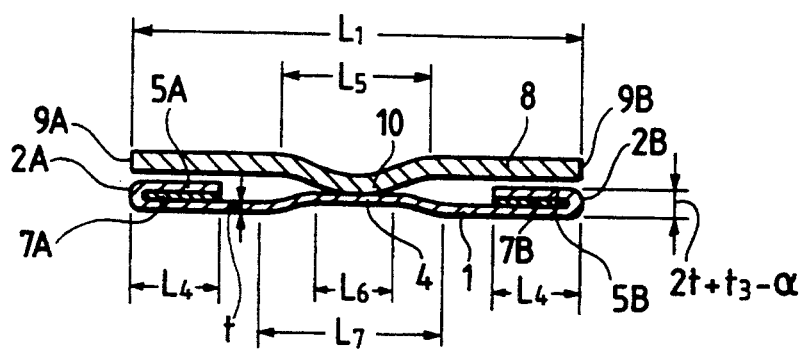
FIG. 18 is a sectional view, which corresponds to a drawing taken along the line I—I in FIG. 14, of still another embodiment of the metallic gasket according to the present invention.
Figure 19:
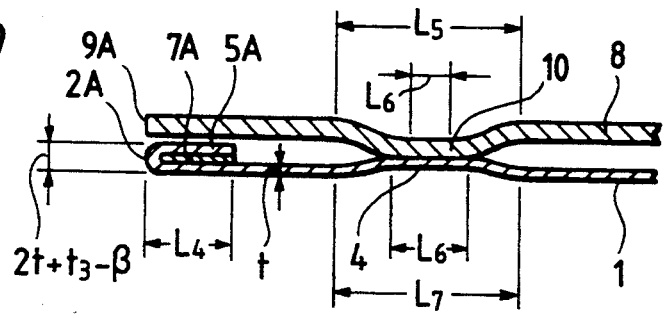
FIG. 19 is a sectional view, which corresponds to a drawing taken along the line V—V in FIG. 14, of the metallic gasket of FIG. 18.

A metallic gasket in an embodiment shown in FIGS. 18 and 19 has the same construction as the metallic gasket shown in FIGS. 16 and 17 except that a soft metallic plate 7 is held in a folded portion 5, and, therefore, a duplicated description thereof is omitted. In the embodiment in FIGS. 18 and 19, soft metallic plates 7A, 7B (which will hereinafter be designated by a reference numeral 7 when they are referred to generically) constituting soft members of $t_3$ (for example, 100–200μ) in thickness are held in folded portions 5. Accordingly, the thickness of the folded portion 5 of the gasket to which a precompression pressure has been applied (amounts of compression are represented by and ) is $2t+t_3-\alpha$ at the part thereof which is between adjacent cylinder bore-aligned holes 2, and $2t+t_3-\beta$ at the cylinder bore-aligned hole-surrounding part except the part between the holes 2. Since $\beta$ has a value larger than that of $\alpha$, the thickness of the part between adjacent cylinder bore-aligned holes 2 is set larger than that of the cylinder bore-aligned hole-surrounding part except the above-mentioned part.

Regarding the soft metallic plate 7, it is possible to form various modified examples. Similar to the case of the folded portion 5, in which the thickness of a part thereof extending in a certain portion of the region surrounding the cylinder bore-aligned hole 2 and that of another part thereof extending in another portion of the same region may be set different as described previously with reference to FIGS. 27 and 28, a part of the soft metallic plate 7 which extends in a certain portion of the region surrounding the cylinder bore-aligned hole 2 may be omitted, or the thickness of this part and that of another part thereof extending in another portion of the same region may be set different. Namely, the soft metallic plate 7 may be formed to large thickness at only the part thereof which is between adjacent holes 2, and to a small thickness at the other part thereof which is exclusive of the above-mentioned part. Besides this example, for instance, the soft metallic plate 7 may be arranged correspondingly to the whole circumference of the folded portion 5, or only in the region between adjacent cylinder bore-aligned holes 2. In the step of forming the folded portion in the production of the metallic gasket in this embodiment, the soft metallic plate 7 is held in the folded portion 5, and a compressive force is applied to the resultant folded portion so as to form the same to a predetermined thickness. Finally, the elastic metallic plate 1 on which the folded portion 5 is formed and the soft metallic plate 7 held in the folded portion 5 are heat-treated to regulate the hardness thereof.

The soft metallic plate 7 is provided for the purpose of regulating a difference between the thickness of the region around a cylinder bore-aligned hole 2 and that of the region on the radially outer side of the relative bead 4. For example, when the thickness of the part of the folded portion 5 which is around the cylinder bore-aligned hole 2 decreases greatly during the precompression of the metallic gasket, the soft metallic plate 7 is laminated on the surface of the gasket on which the projecting surface of the bead 4 extends, and then held in the folded portion 5, whereby a difference in height between the folded portion 5 and the region on the radially outer side of the relative bead 4 is increased.

In the embodiments shown in FIGS. 16-19, the width in the radial direction of the cylinder bore-aligned hole of the bead 4 on the lower bead plate 1 is set larger than that of the bead 10 on the upper bead plate 8 but this width is not limited to the level in these embodiments; the width of both of these beads 4, 10 may be set equal.

Figure 20:
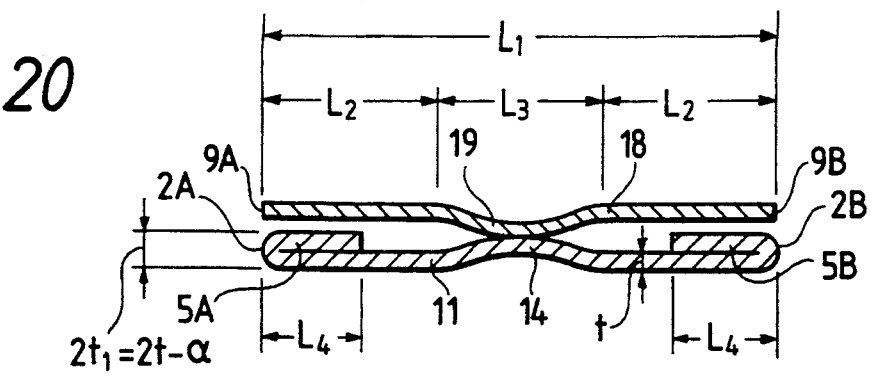
FIG. 20 is a sectional view, which corresponds to a drawing taken along the line IV—IV in FIG. 14, of a further embodiment of the metallic gasket according to the present invention.
Figure 21:
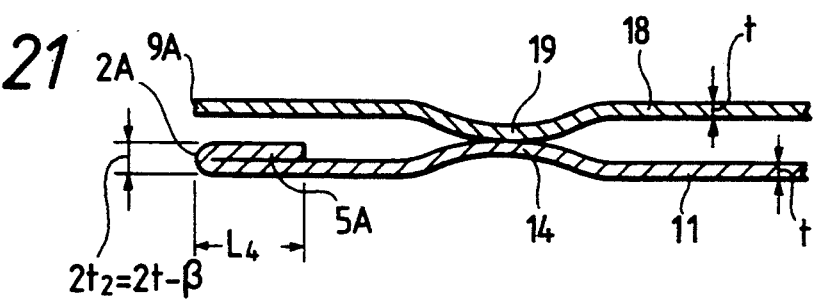
FIG. 21 is a sectional view, which corresponds to a drawing taken along the line V—V in FIG. 14, of the metallic gasket of FIG. 20.

In a metallic gasket in an embodiment shown in FIGS. 20 and 21, the lower and upper bead plates 11, 18 consist of the same material, and have the same thickness. The shape of the beads 14, 19 on the lower and upper bead plates 11, 18 is identical, and these beads 14, 19 are arranged symmetrically with respect to the joint surfaces of a cylinder head and a cylinder block. The methods of producing these two bead plates do not differ except that one of them includes a step of forming the folded portions 5A, 5B. Since the thickness t of the bead plates 11, 18 is equal, the stress imparted thereto when they are tightened is carried thereby equally. Accordingly, a metallic gasket in which stress occurs most gently is provided.

Figure 22:
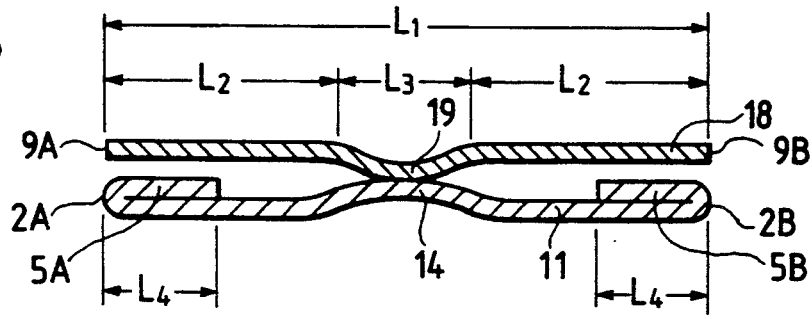
FIG. 22 is a sectional view, which corresponds to a drawing taken along the line IV—IV in FIG. 14, of another embodiment of the metallic gasket according to the present invention.
Figure 23:
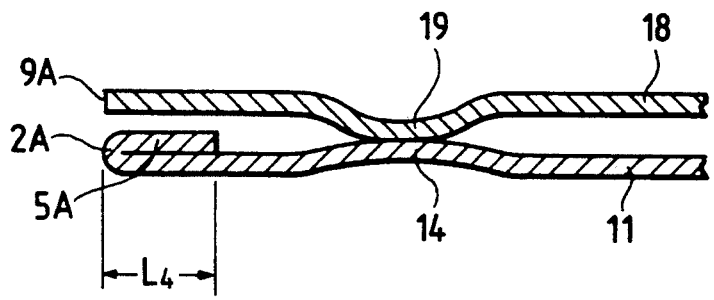
FIG. 23 is a sectional view, which corresponds to a drawing taken along the line V—V in FIG. 14, of the metallic gasket of FIG. 22.

In an embodiment of the metallic gasket shown in FIGS. 22 and 23, the lower and upper bead plates 11, 18 consist of the same material and have the same thickness just as the embodiment shown in FIGS. 20 and 21. The width in the radial direction of the cylinder bore-aligned hole of a bead 14 on the lower bead plate 11 is set larger than that of a bead 19 on the upper bead plate 18. Therefore, the spring constant of the lower bead plate 11 is smaller correspondingly. Even if the beads on both of these elastic metallic plates deviate slightly when the plates 11, 18 are combined, they are not abnormally deformed, nor does the sealing performance thereof decrease just as in the case of the embodiment shown in FIGS. 16-19.

Figure 24:
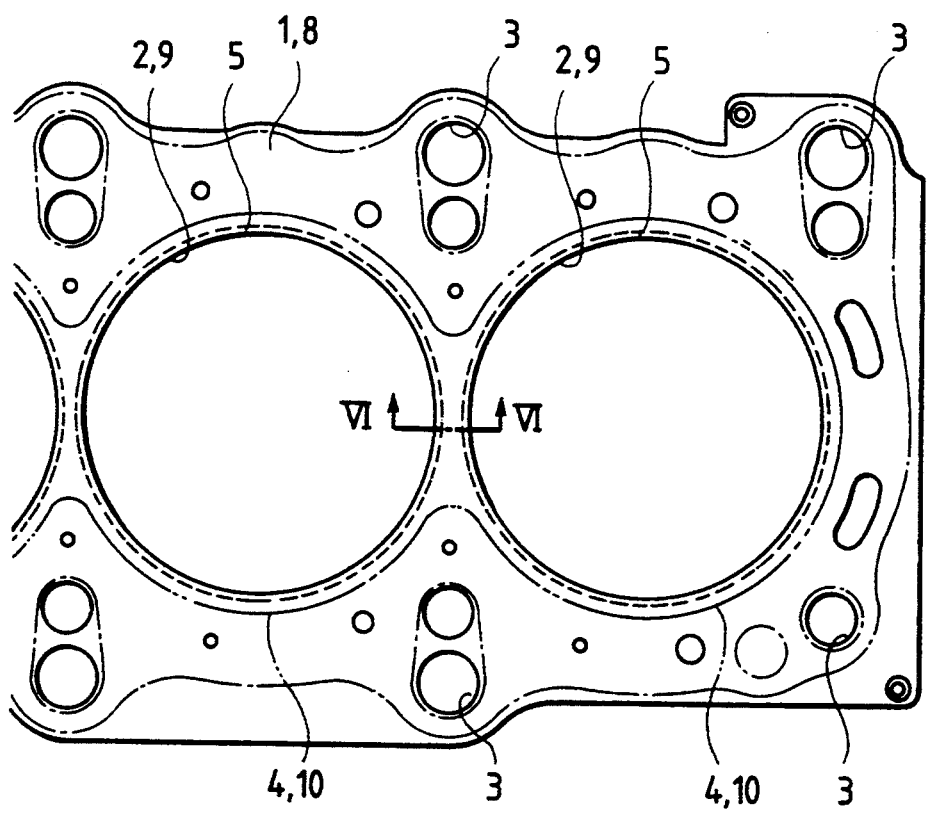
FIG. 24 is a plan view of a further embodiment of the metallic gasket according to the present invention.
Figure 25:
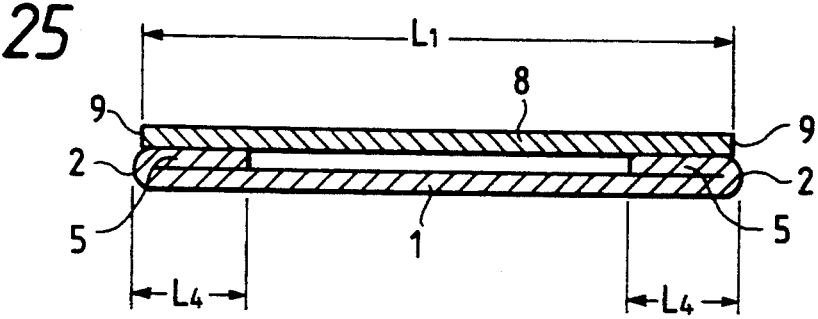
FIG. 25 is a sectional view taken along the line VI—VI in FIG. 24 of the embodiment of FIG. 24 of the metallic gasket according to the present invention.

In an embodiment of the metallic gasket shown in FIGS. 24 and 25, folded portions 5 are formed around the whole circumferences of cylinder bore-aligned holes 2, 9, and beads 4, 10 around the parts of the circumferences of these holes 2, 9 which are exclusive of the parts thereof between these holes 2, 9, the beads 4, 10 being reversed in a region close to a region between the holes 2, 9 and joined to the circumferences of the holes 2, 9, the beads 4, 10 being thus not formed in the region between the same holes 2, 9. Although this embodiment has no structural modifications around the cylinder bore-aligned holes 2, 9 as compared with, for example, the metallic gasket shown in FIGS. 16 and 17, the structure thereof in the region between these holes 2, 9 is different. Namely, the embodiment of FIGS. 24 and 25 is not provided with beads on the regions of the lower and upper bead plates 1, 8 which are between these holes 2, 9 as compared with the embodiment of FIG. 16. Accordingly, the folded portions 5 of the lower bead plate 1 contacts the opposite surface of the upper bead plate 8.

Figure 26:
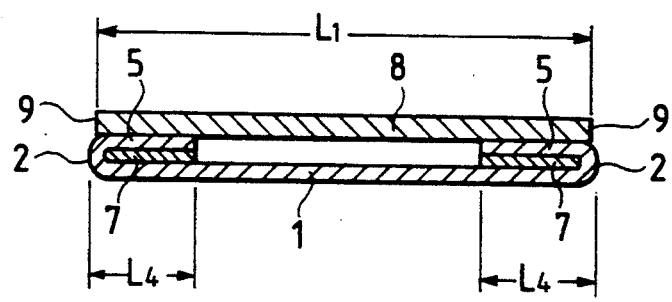
FIG. 26 is a sectional view, which corresponds to a drawing taken along the line VI—VI in FIG. 24, of another embodiment of the metallic gasket according to the present invention.

Although the embodiment of the metallic gasket shown in FIGS. 24 and 26 has no structural modifications around the cylinder bore-aligned holes 2, 9 as compared with the embodiment of FIGS. 18 and 19, the structure thereof in the region between these holes 2, 9 is different. Namely, the embodiment of FIG. 26 is not provided with beads on the regions of the lower and upper bead plates, 1, 8 which are between these holes 2, 9 as compared with the embodiment of FIG. 18. The embodiment of FIG. 26 is provided with soft metallic members 7 held in the folded portions 5 around the same holes 2, 9.

What is claimed is:

1. A metallic gasket consisting of:
a first elastic metallic plate provided with a plurality of first beads, each of said plurality of first beads respectively formed along a circumference of each of a plurality of first cylinder bore holes, each of said plurality of first beads being formed so as to have a projecting portion extending from a first surface of said first elastic metallic plate and a recessed portion corresponding with said projecting portion set back from a second surface of said first elastic metallic plate,
a plurality of folded portions bent back onto said first surface to respectively extend along said circumference of each of said plurality of first cylinder bore holes, each of said plurality of folded portions formed to a thickness smaller than a height of said plurality of first beads, and
a second elastic metallic plate provided with a plurality of second beads respectively oppositely abutting against said plurality of first beads on said first elastic metallic plate, said second elastic metallic plate being further provided with a plurality of second cylinder bore holes each having a circumference respectively aligned and substantially equal to said circumference of said plurality of first cylinder bore holes, each of said plurality of second beads respectively formed along said circumference of each of said plurality of second cylinder bore holes, said plurality of folded portions formed on said first elastic metallic plate functioning as stoppers to prevent said plurality of first beads on said first elastic metallic plate and said plurality of second beads on said second elastic metallic plate from being fully compressed.

2. A metallic gasket according to claim 1, wherein the thickness of said first elastic metallic plate is set substantially not greater than that of said second elastic metallic plate.

3. A metallic gasket according to claim 1, wherein said plurality of first beads and said plurality of second beads are respectively formed completely annularly relative to said plurality of first cylinder bore holes and said plurality of second cylinder bore holes.

4. A metallic gasket according to claim 1, wherein a cross-section of each of said plurality of first beads and said plurality of second beads is formed so as to have an arcuately projecting top portion along all of a circumference of both said plurality of first beads and said plurality of second beads.

5. A metallic gasket according to claim 1, wherein a cross-section of said plurality of first beads are formed so as to have an arcuately projecting top portion on a circumference of said plurality of first beads between the plurality of first cylinder bore holes, and a flat projecting top portion on a cross-section of said plurality of first beads on a remainder of said circumference of said plurality of first beads.

6. A metallic gasket according to claim 1, wherein said plurality of folded portions are formed to a larger thickness along said circumference of said plurality of first cylinder bore holes between the plurality of first cylinder bore holes, and to a smaller thickness along a remainder of said circumference of said plurality of first cylinder bore holes.

7. A metallic gasket according to claim 1, wherein said plurality of folded portions are formed to substantially a same thickness along all of said circumference of said plurality of first cylinder bore holes.

8. A metallic gasket according to claim 1, wherein said projecting portion of said plurality of first beads and a projecting portion of said plurality of second beads are arranged so as to be abutted to each other.

9. A metallic gasket according to claim 1, wherein a width of said projecting portion is larger than that of a projecting portion of said plurality of second beads.

10. A metallic gasket according to claim 1, wherein a width of each of said plurality of first beads is larger along an entire circumference of each of said plurality of first beads than a width of each of said plurality of second beads, a width of said plurality of second beads being smaller along said circumference of said plurality of second cylinder bore holes between the plurality of second cylinder bore holes, and larger along a remainder of said circumference of said plurality of second cylinder bore holes.

* * * * *